April 1, 1958 L. M. SILVA 2,829,322
AUTOMATIC CONTROL MECHANISM
Filed May 9, 1955 5 Sheets-Sheet 1
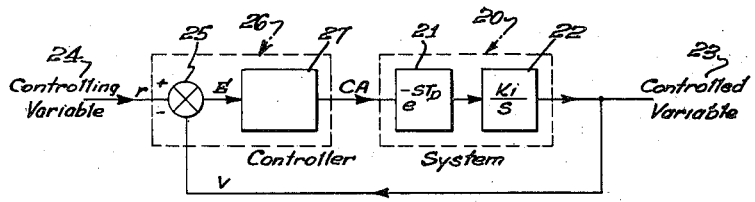
Fig. 1.
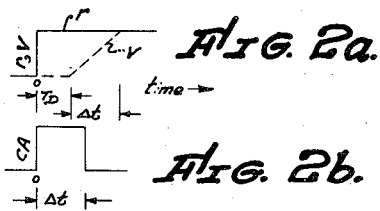
Fig. 2a.
Fig. 2b.
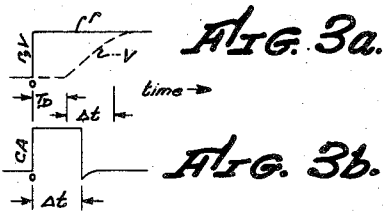
Fig. 3a.
Fig. 3b.
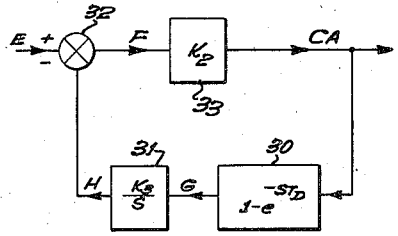
Fig. 4.
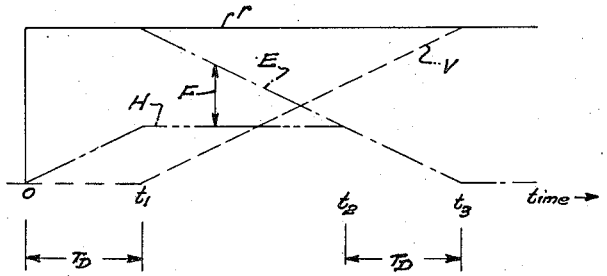
Fig. 6a.
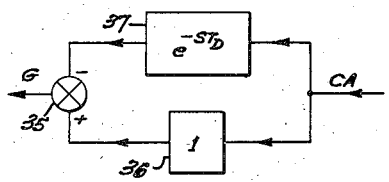
Fig. 5.
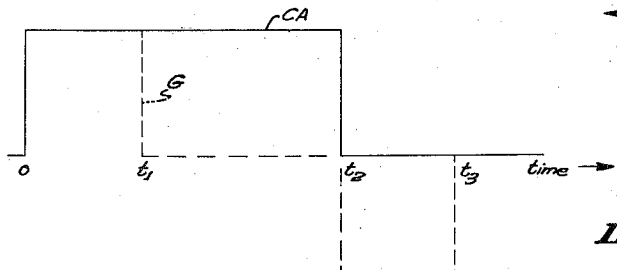
Fig. 6b.
LAWRENCE M. SILVA,
INVENTOR.
By His Attorneys
HARRIS, KIECH, FOSTER & HARRIS.

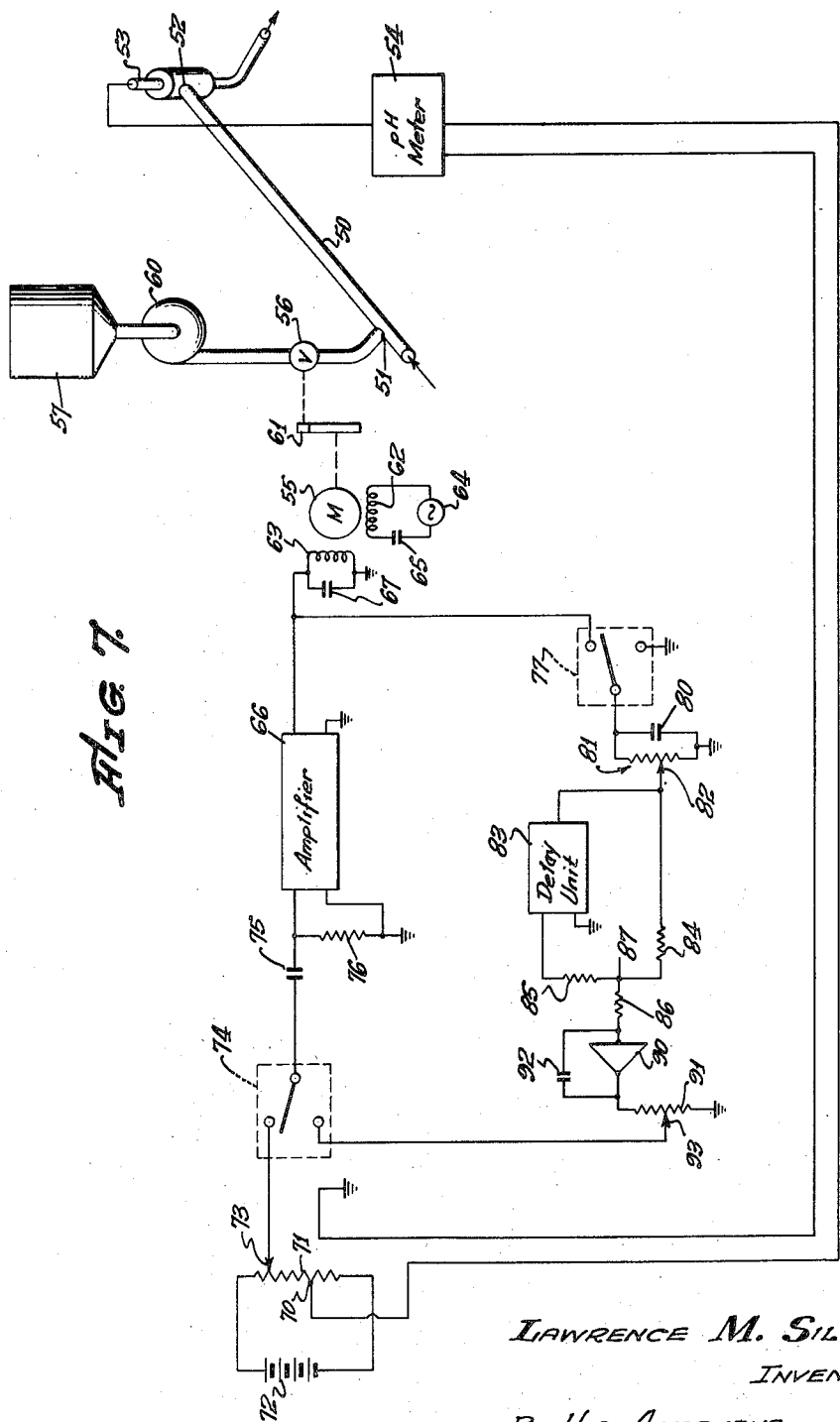

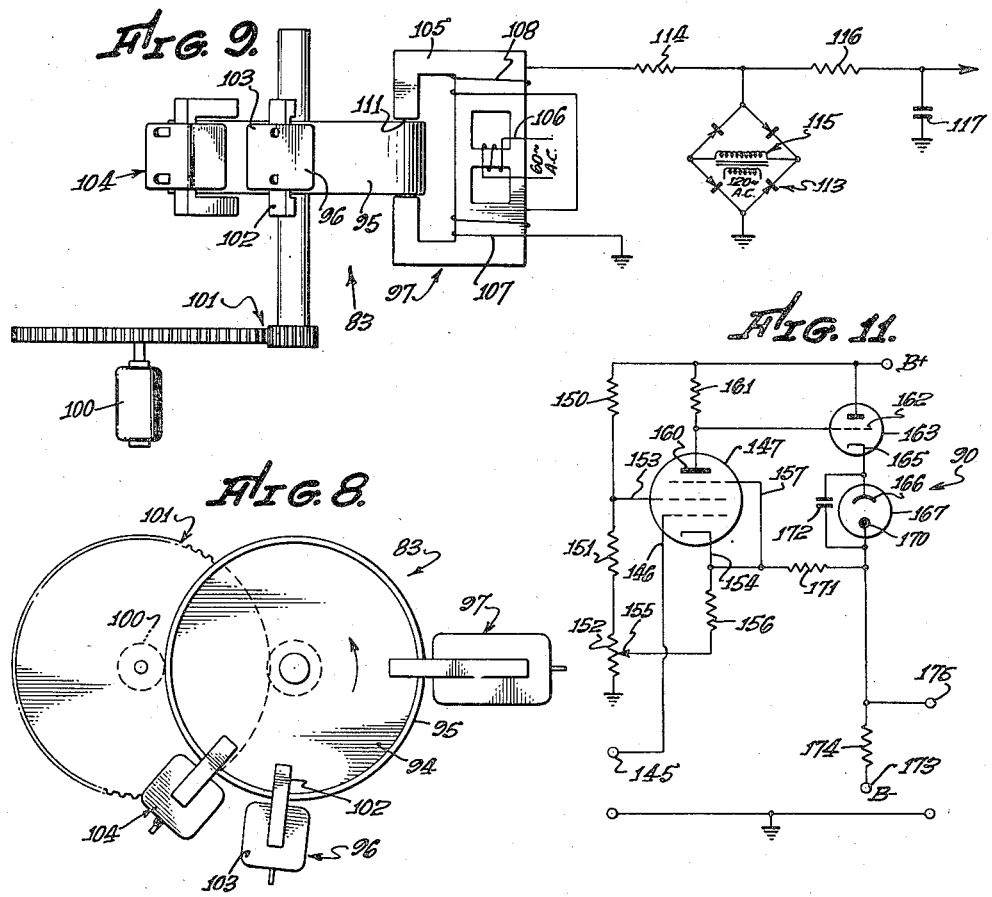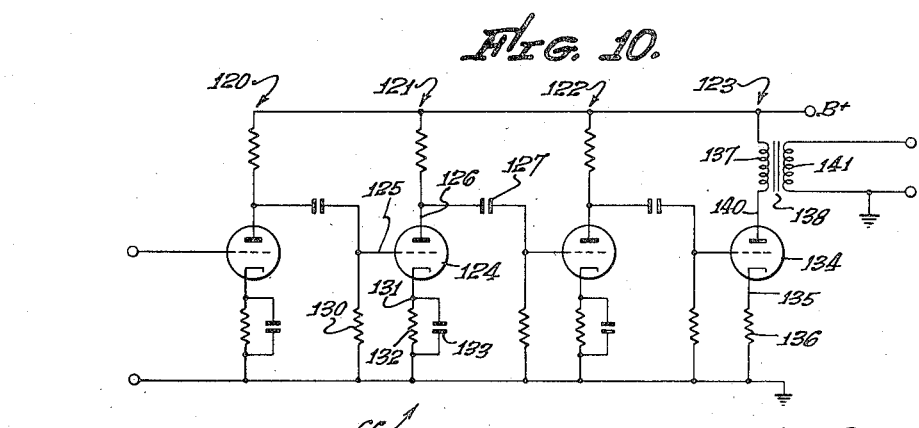

April 1, 1958 L. M. SILVA 2,829,322
AUTOMATIC CONTROL MECHANISM
Filed May 9, 1955 5 Sheets-Sheet 4
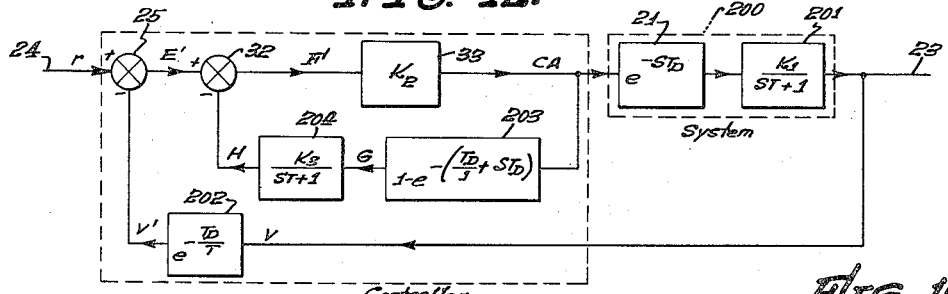
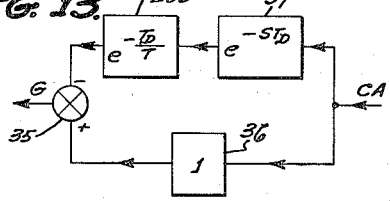
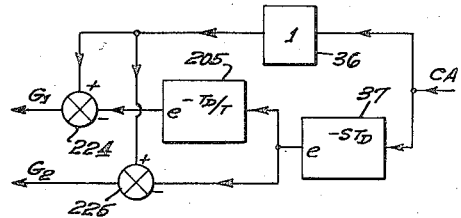
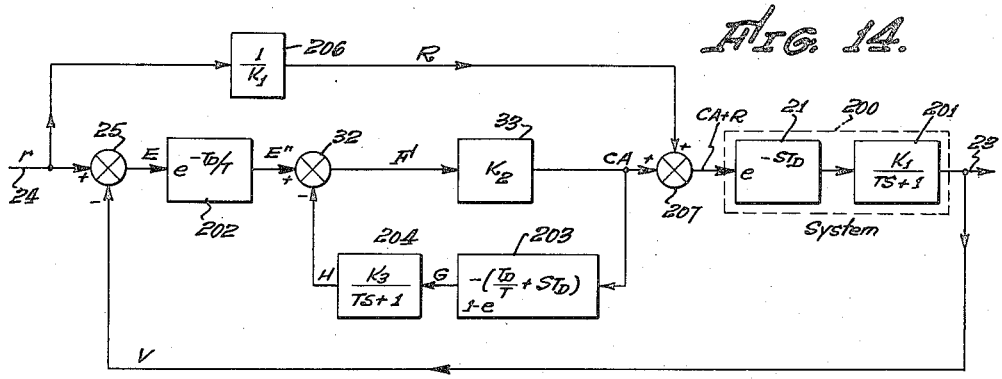
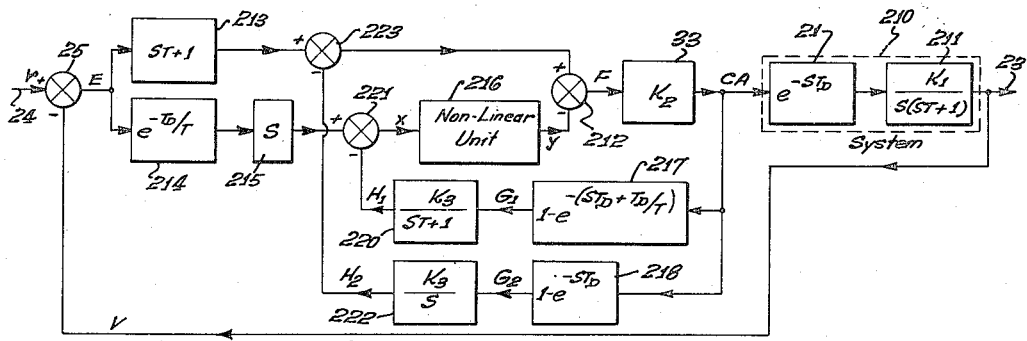
LAWRENCE M. SILVA,
INVENTOR.
By His Attorneys.
HARRIS, KIECH, FOSTER & HARRIS.

April 1, 1958 L. M. SILVA 2,829,322
AUTOMATIC CONTROL MECHANISM
Filed May 9, 1955 5 Sheets-Sheet 5
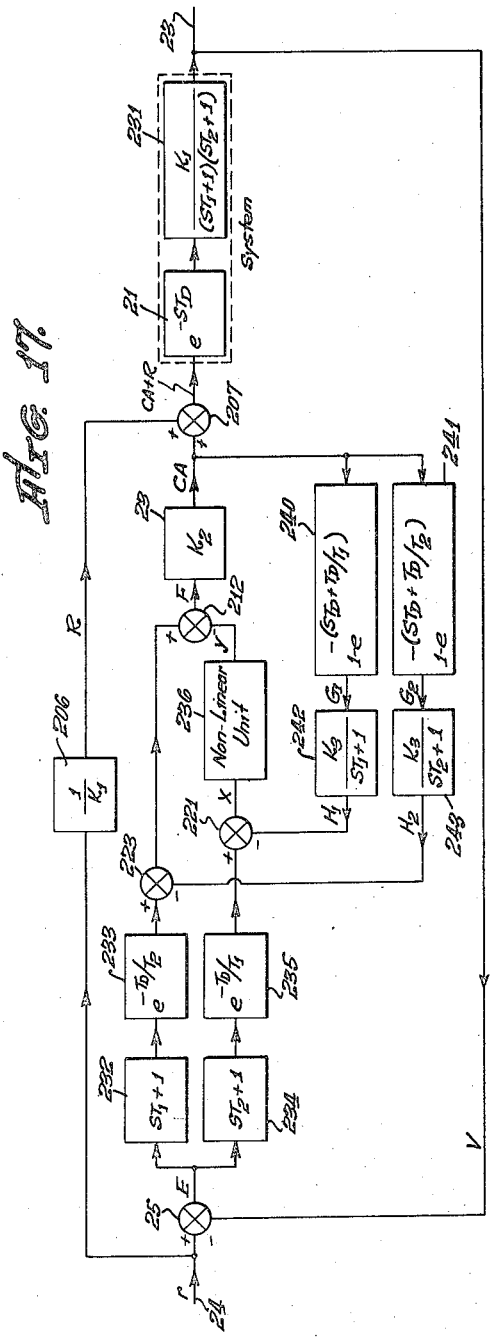
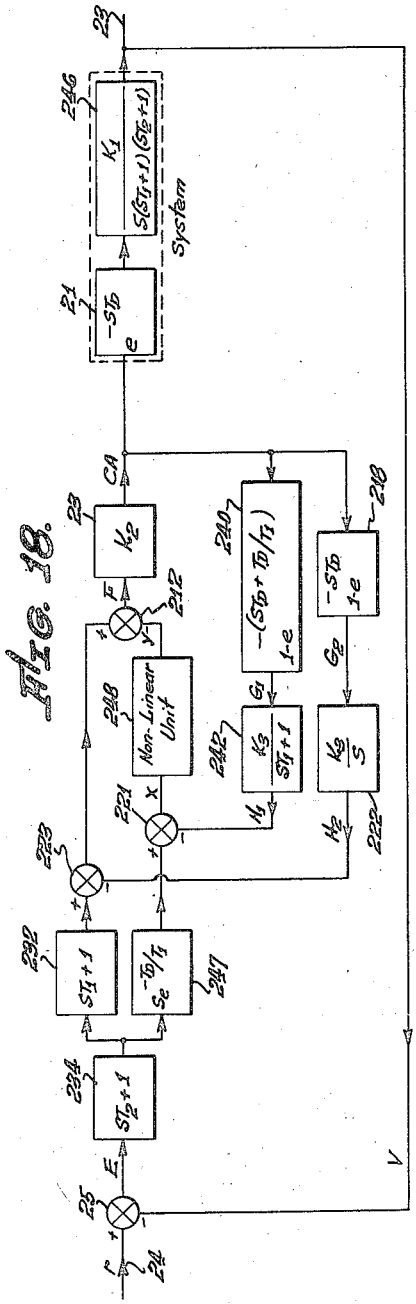
Lawrence M. Silva,
Inventor.
By His Attorneys
Harris, Kiech, Foster & Harris.

United States Patent Office 2,829,322
Patented Apr. 1, 1958

2,829,322

AUTOMATIC CONTROL MECHANISM

Lawrence M. Silva, Fullerton, Calif.

Application May 9, 1955, Serial No. 507,110

18 Claims. (Cl. 318—28)

This invention relates to automatic control mechanisms and in particular to those applicable to the control of systems characterized by dead time or transport lag.

Dead time in a system is the time elapsing between the initiation of a corrective action in the system and the detection of the effect of the corrective action upon the system. For example, consider a system concerned with maintaining a constant temperature in a liquid flowing through a pipe, where the source of heat is at a distance along the pipe upstream from the temperature measuring unit. The dead time of the system will include the time required for the heated liquid to move from the point of application of the heat to the point where the temperature increase is noted.

All automatic control mechanisms are characterized by having a controlled variable and a controlling variable. In the above example the actual temperature of the liquid at the point where the temperature is measured is the controlled variable, and the desired temperature is the controlling variable. In a "zeroing" type of operation the status of the controlling variable is fixed and the purpose of the automatic control mechanism is to reduce any deviation of the controlled variable from this fixed status to less than some acceptable maximum. This deviation is ordinarily called the error, hence the automatic control mechanism brings the error to zero. In a "following" type of operation the status of the controlling variable is influenced by factors foreign to the control mechanism. The purpose of the control mechanism is to change the status of the controlled variable to correspond to the changes in the controlling variable brought on by outside factors. Hence, the controlled variable "follows" the controlling variable, lagging behind less than some acceptable maximum. The deviation in the "zeroing" operation and the lag in the "following" operation may be referred to as the status difference between the controlled and the controlling variables. It is an object of this invention to provide an automatic control mechanism for a system characterized by dead time which will reduce this difference in status to less than a predetermined maximum in an optimum period of time without hunting or other unstable phenomena.

The status difference to be controlled may be that of any characteristic or quality for which status-sensing devices can be provided, such as difference in position, velocity, volume, temperature, color, light intensity, chemical concentration, product quality, etc. This listing is not to be considered as a limitation on the applicability of the invention. A further object of this invention is to provide an automatic control mechanism for a system characterized by dead time which can function with the signals from any type (viz., electric, pneumatic, mechanical, hydraulic, etc.) of status-sensing device.

The predominant characteristic of systems with dead time is the fact that it is impossible instantaneously or immediately to influence the value of the controlled medium or variable. Further, the dead time which exists in a system stores energy or delays the transference of information or action from the input or controlling variable to the output or controlled variable. Thus it is necessary to consider the effect of this stored energy or delayed information on the future excursions of the controlled variable since it is impossible to modify or alter the course of the controlled variable for a period of time $T_D$, referred to as dead time, after the need for such modification or alteration is detected. It is an object of the invention to provide a predictor controller for an automatic control mechanism which recognizes this fundamental limitation and bases its corrective action on the predicted value of the controlled variable at an instant $T_D$ units of time later. In the dynamic analysis of a system, the dead time appears as energy and will be treated as such throughout this description, whether it is actually stored energy or a delay in the transfer of information or some other form.

It can be shown by mathematical analysis and is readily apparent from a physical analysis of simpler cases that a difference in status in a system characterized by dead time can be reduced to zero in the minimum amount of time by driving the output member at a maximum level in plus and/or minus directions for the entire period during which corrective action is applied, this being determined by limitatons in the power source supplying the output member or by saturation phenomena existing in the system.

An example is that of driving an automobile from a point A to a point B. The automobile has a maximum acceleration rate and velocity and a maximum deceleration or braking rate. Starting from A the maximum acceleration is applied and the automobile's speed increases steadily. At some point X, intermediate points A and B, the acceleration is removed and the brakes are applied to obtain maximum deceleration. From this point on the automobile's speed steadily decreases, and if X was selected properly, the automobile will stop precisely at B, arriving there in the absolute minimum elapsed time. Two problems are present in this method of control: where is point X; and, what if, through some error or intervening change in position of B, the automobile does not stop exactly at B?

A different situation exists if a finite time delay or lag exists between the time of command and the time at which the automobile enters an acceleration or deceleration period. It can be readily appreciated that for the same distance from A to B and in an identical automobile, the point X, at which the acceleration terminates and the deceleration phase commences, must be the same in both examples. However, in the present example the automobile will remain a finite time, $T_D$, at point A after the acceleration command has been executed. Also the deceleration command must be given a period of time, $T_D$, prior to the arrival of the automobile at point X since the new command will be delayed $T_D$ before it is executed. The introduction of dead time, into the system thus requires the anticipation of future actions and has the outward effect of increasing the time required to move the automobile from A to B by the magnitude of the dead time, $T_D$.

An object of this invention is to provide an automatic control mechanism for a system characterized by dead time which gives an automatic and precise solution for the aforementioned problems.

Neglecting the dead time in a system, it can be shown that the number of forcing periods (e. g., periods of maximum acceleration or deceleration in the automobile example) required in order to achieve the optimum mode of control is equal to the order of the differential equation which describes the system. Thus a system described by a first order differential equation will require a single forcing period, and systems which can be described by second or third order differential equations will require two or three alternate forcing periods respectively. In the case of systems possessing dead time, the same considerations apply and it has been found that the number of periods of forcing required is equal to the order of the differential equation of the system excluding the effects of dead time.

Two classes of automatic control mechanism were known in the past, on-off control and continuous control. Neither of these operates in the ideal manner described above. In the on-off control, the controller supplies only two fixed amounts of corrective action, an output tending to reduce a positive difference in status and an output tending to reduce a negative difference in status. The two may or may not be equal in magnitude and one may be zero or substantially so. When the difference becomes greater than the acceptable maximum, the on-off control produces an output of fixed magnitude tending to reduce this difference and this output continues until the difference in status is reduced to less than the maximum acceptable error. At this point the corrective action ceases. Differences in status can be reduced in short periods of time by use of large outputs or corrective actions in the control mechanism. But since the magnitude of the correction is constant and at a high level regardless of the degree of difference, an overshooting of the zero difference point may occur, resulting in a difference of opposite sign calling for maximum corrective action in the opposite direction or sense. In second and higher order systems and in systems characterized by dead time, this recurring application of large outputs causes oscillation and can lead to a sustained oscillation which will impair the performance of the system.

In the continuous control, the controller output is a linear integro-differential function of the difference in status. For large differences, large outputs are generated and as the difference is reduced the output also decreases. This characteristic of the continuous control gives stable operation without hunting and permits the use of a small maximum acceptable difference. However the time consumed in reducing large differences is considerably greater than that for an on-off type of control.

If the system includes dead time comparable to the magnitude of the largest system time constant, then it is necessary in either the on-off or continuous type of control to decrease the sensitivity of the controller or to increase the system time constant in order to maintain stable operation without sustained oscillations. This limitation on the sensitivity or the time constant will appreciably degrade both the speed of response of the over-all system and the magnitude of the maximum difference of status which can exist.

Another object of this invention is to provide an automatic control mechanism which has the speed of response characteristic of the on-off control in systems without dead time, and the stability and accuracy of the continuous control in systems without dead time, in conjunction with systems that possess appreciable amounts of dead time.

In many industrial processes or systems it is difficult or impossible to ascertain analytically the order and the coefficients of the differential equation which describes the system. As a result, it is common practice in the art to obtain the significant coefficients in the differential equation experimentally from either the frequency response for the system or the system signature. The frequency response of a system may be obtained by sinusoidally exciting the input to the system and measuring the response of the controlled variable. The frequency response of the system is the ratio of the excursions of the controlled and controlling variables. In general, the controlled variable excursions will not be in phase with the excitation and it is necessary to determine the amplitude ratio and the phase shift between the output and excitation. From a frequency response diagram it is readily possible to derive the significant coefficients of the differential equation of the system.

The signature method is an alternate technique for obtaining the significant dynamic characteristics of a system. It involves obtaining the response of the controlled variable to a step input or a discontinuous jump in the magnitude of the controlling variable. From this system signature or output response it is possible to obtain the coefficients of the differential equation. In practice it is convenient to approximate this equation by either a first, second, or third order differential equation plus a dead time, $T_D$. In general it is found that either a first or second order equation plus a dead time, $T_D$, is adequate.

A further object of the invention is to provide an automatic control mechanism for systems for which complete detailed information is lacking and one in which the design and instrumentation of the controller in the automatic control mechanism are determined from experimental system data which is readily available.

It is characteristic of many systems that the differential equation describing the entire system is of a very high order. The problem of instrumenting an automatic control mechanism to perform according to the ideal prescribed by mathematical and physical analysis (i. e., $n$ forcing periods for $n^{th}$ order system) is difficult and with respect to third and higher order systems only highly impractical solutions have been produced. In general it is found that these higher order systems possess a large number of time constants which are small in comparison to the largest system time constant or to the two or three larger time constants. In these instances it is convenient to approximate the system dynamics by the one, two, or three largest time constants or some combination thereof, plus a certain magnitude of dead time, $T_D$. Accordingly, a further object of the invention is to provide an achievable practical mechanism for control of systems, especially those of third and higher order, which is small, simple and inexpensive to produce, and simple and convenient to set up and adjust, yet which very closely approaches the ideal control in performance.

Another object of the invention is to provide an automatic control mechanism for a system characterized by dead time, $T_D$, in which a signal representative of the controller output at a time, $T_D$, earlier is fed back into the controller, thereby supplying information on the amount of corrective action energy stored in the system due to the dead time.

A still further object of this invention is to provide an automatic control mechanism which reduces a difference in status between the controlled variable and the controlling variable of a system which can be described by dead time, $T_D$, plus ingrating action, in the following manner: first, application of maximum corrective action tending to reduce the status difference for a first period of time immediately following the creation of the difference; and second, application of proportional control action for a second period of time in which the corrective action applied is of magnitude less than maximum and substantially proportional to the magnitude of the predicted difference in status which will exist at time $(t+T_D)$ where $t$ is present time or real time.

A further object of this invention is to provide an automatic control mechanism which reduces a difference in status between the controlled variable and the controlling variable of a system which can be described by dead time, $T_D$, plus a time constant, in the following manner: first, application of maximum corrective action tending to reduce the status difference for a first period of time immediately following the creation of the difference; and second, application of proportional control action for a second period of time in which the corrective action applied is of magnitude less than maximum and substantially proportional to the magnitude of the predicted difference in status which will exist at the time $(t+T_D)$.

A still further object of the invention is to provide an automatic control mechanism which reduces in minimum time the difference in status between the controlled variable and the controlling variable in a system which can be described by dead time, $T_D$, plus a second order differential equation of the form.

$$T\frac{d^2V}{dt^2}+\frac{dV}{dt}=K[CA]$$

where T is a time constant, V is representative of the status of the controlled variable, K is the sensitivity of the system and CA is the corrective action applied to the system, in the following manner subsequent to the appearance of a positive difference in status: first, application of maximum corrective action, CA max., tending to reduce the status difference for a first period of time immediately following the creation of the difference; second, application of a maximum corrective action, CA min., in a sense opposing the first corrective action for a second period of time; and, third, application of proportional control action for a third period of time in which the corrective action applied is of magnitude less than maximum and substantially proportional to the magnitude of the predicted difference in status which will exist at time $(t+T_D)$. In the event that the difference in status is initially negative, the order in which CA max. and CA min. are applied is reversed. The above system is said to have a dynamic behavior characterized by dead time plus integrating action plus a time constant.

Another object of the invention is to provide an automatic control mechanism which reduces in minimum time a difference in status between the controlled variable and the controlling variable of a system which can be described by dead time, $T_D$, plus a second order differential equation of the form:

$$T_1T_2\frac{d^2V}{dt^2}+(T_1+T_2)\frac{dV}{dt}+V=K[CA]$$

in the following manner: first, application of maximum corrective action tending to reduce the status difference for a first period of time immediately following the creation of a difference; second, application of a maximum corrective action in a sense opposing the first corrective action for a second period of time; and third, application of proportional control action for a third period of time in which the corrective action applied is of magnitude less than maximum and substantially proportional to the magnitude of the predicted difference in status which will exist in time $(t+T_D)$. This system is said to have a dynamic behavior characterized by dead time plus two time constants.

A still further object of the invention is to provide an automatic control mechanism which reduces in substantially minimum time a difference in status between the controlled variable and the controlling variable of a system which can be described by dead time plus an $n^{th}$ order differential equation of the form:

$$a_n\frac{d^nV}{dt^n}+a_{n-1}\frac{d^{n-1}V}{dt^{n-1}}+\cdots+a_2\frac{d^2V}{dt^2}+a_1\frac{dV}{dt}+a_0V=CA$$

in the following manner: first, application of maximum corrective action tending to reduce the status difference for a first period of time immediately following the creation of the difference; second, application of a maximum corrective action of the sense opposing the first corrective action for a second period of time; and third, application of proportional control action for a third period of time in which the corrective action applied is of magnitude less than maximum and substantially proportional to the predicted magnitude and sign which will exist at a ime $(t+T_D)$ of a secondary variable, $x$, which is obtained from the difference in status of the controlled variable and the controlling variable. The coefficient $a_0$, or the coefficients $a_0$ and $a_1$ of the above differential equation may be identically equal to zero. In this situation the system described by the above differential equation is said to have either a single or double integrating action respectively.

In my now-pending application, Serial No. 450,199, a method of control for third and higher order systems without dead time was disclosed. The essential feature of the method of operation described in that application was that maximum corrective action was applied in two periods in such manner that at the end of the second period a subsidiary variable, $x$, and its derivative were identically equal to zero. At the end of the second period of corrective action the system was on a natural trajectory that would pass through the origin of the $n$ dimensional phase space of the system, at which time the error or difference in status would be zero. The same considerations apply for systems which include dead time. However, in this latter instance it is neceessary to base the duration of the application of corrective action on the predicted value of $x$ at time $(t+T_D)$ rather than its present value, as employed in the now-pending application.

The prediction of future values of $x$ is based on obtaining information about the total net energy stored in the dead time or transport lag of the system. From a knowledge of this stored energy it is possible to determine the future excursions up to time $(t+T_D)$ of the $x$ variable to apply corrective action accordingly. The essential difference between the now-pending application and the present application is that, in the latter, the application and reversal of corrective action are based on the predicted value of the controlled variable at a period of time, $T_D$, later, since the effects of the energy stored in the dead time of the system will completely determine the future excursions of the controlled variable in that intervening period. An automatic control mechanism having the type of operation described above will provide the large magnitudes of corrective action and the rapid reduction of difference characteristic of the on-off control when a difference initially exists, and will also provide a means of maintaining a small difference in status during steady state conditions at the end of a difference reducing period.

Another object of the invention is to provide an automatic control mechanism for a system characterized by dead time having a controller which produces an output which is a nonlinear integro-differential function of the difference in status of the controlled and controlling variables, and having an amplifier the output of which is continuously variable between predetermined limits.

Other objects and advantages of the invention and various features of construction and operation thereof will become apparent to those skilled in the art upon reference to the following specification and the accompanying drawings wherein certain embodiments of the invention are illustrated.

Referring to the drawings, which are diagrammatic only, but which suggest to those skilled in the art the basis for the present invention and exemplary instrumentation thereof:

Fig. 1 is a block diagram of one embodiment of the invention;

Figs. 2a and 2b graphically represent certain ideal relations of the invention;

Figs. 3a and 3b graphically represent certain actual relations of the invention;

Fig. 4 is a block diagram of the controller of Fig. 1;

Fig. 5 is a block diagram of the memory unit of Fig. 4;

Figs. 6a and 6b graphically represent the relations of the various components of the embodiment of Fig. 1;

Fig. 7 is an exemplary instrumentation of the embodiment of the invention shown in Fig. 1;

Fig. 8 is a plan view of the delay unit of Fig. 7;

Fig. 9 is a side elevation view of the delay unit, including a schematic of the electrical components thereof;

Fig. 10 is a schematic diagram of an amplifier of Fig. 7;

Fig. 11 is a schematic diagram of another amplifier of Fig. 7;

Fig. 12 is a block diagram of another embodiment of the invention;

Fig. 13 is a block diagram of the memory unit of the embodiment of Fig. 12;

Figs. 14 and 15 are block diagrams of two other embodiments of the invention;

Fig. 16 is a block diagram of the memory units of the embodiment of Fig. 15; and Figs. 17 and 18 are diagrams of two other embodiments of the invention.

A simplified block diagram of an automatic control mechanism incorporated into a system which can be described by dead time plus integrating action is shown in Fig. 1. Therein a system 20 is presented in standard transfer function notation applicable to any system where $e^{-ST_D}$ represents the dead time and $$\frac{K_1}{S}$$

represents an element whose output is $K_1$ times the integral of its input, S being the Laplace transform operator. In the diagram a dead time element 21 is serially connected to an integrating element 22. This serial connection is used only for the purpose of convenience in representing the characteristics of the system.

In an actual system the dead time is the result of distributed energy storage elements and cannot usually be isolated. However, if the dynamic behavior of the system is examined, it will be found that the system behavior is indistinguishable from that of the serially connected elements used in the illustration to represent the system. In all discussions which follow this aspect of a real system is recognized by restricting the introduction of corrective action to the system input and by avoiding the use of information contained in the serially connected structure at the output of the dead time element. Since the system can only accept information or command action at its input and since this command action manifests itself as excursions of the controlled variable, the order of the serially connected elements 21, 22 is unimportant.

In Fig. 1, signals, V and $r$, respectively representative of the status of a controlled variable 23 and a controlling variable 24, are connected to a summation means 25 which is part of a controller 26. The summation means furnishes an output, E, equal to the difference in status, $r-V$, of the controlled and controlling variables. The difference, E, is operated upon by a computer 27 to produce the required corrective action, CA, necessary to reduce the difference in status.

Performance curves of a control mechanism which operates in accordance with the ideal prescribed by the mathematical analysis referred to above are given in Figs. 2a and 2b. Therein a step function signal has been injected into the controlling variable at time, $t=0$. The controller, knowing the magnitude of the input, $r$, the maximum corrective action, CA max. and CA min. available, the sensitivity $K_1$, and dead time, $T_D$, of the system, applies corrective action CA max. for a period of time $\Delta t$ (Fig. 2b), at the end of which time it predicts that the difference in status will be zero after an additional time equal to the dead time, $T_D$, has elapsed. Based on this prediction the controller removes the corrective action, CA, at the end of the period, $\Delta t$, since the energy or information stored in the system dead time is just sufficient to reduce the status difference to zero without further corrective action from the controller. The effect of the corrective action on the system is delayed by the time, $T_D$, and the minimum time for reducing the difference in status is $T_D+\Delta t$ (Fig. 2a).

In practice, it is found that errors corrupt this idealized operation and that varying corrective action less than the maximum must be applied following the period of maximum corrective action. Curves illustrating this type of operation are shown in Figs. 3a and 3b, wherein the corrective action applied after the time, $\Delta t$, has elapsed is substantially proportional to the residual difference in status which will exist at a period of time, $T_D$, later.

The errors existing in a practical control mechanism may be due to errors in determining the dynamic characteristics of the system, to errors in instrumenting the controller, and to errors due to simplifying approximations made in the construction of the control mechanism. An important feature of the invention is the fact that the proportional control action of Figs. 3a and 3b is provided by a control mechanism which will operate as a pure on off control in the ideal manner of Figs. 2a and 2b when no errors are present, without requiring additional computers, circuitry, components, etc.

The physical embodiment of the integrating element 22 may be in the form of a floating-type pneumatic valve a damped electric motor, an electronic integrator, or the like. In certain types of systems it is possible that the integrating element 22 would be included physically with the controller 26, leaving the system 20 to be described by a simple dead time. This arrangement is typical of the systems encountered in the chemical industry in the control of towers and distillation columns. The corrective action, CA, applied to the system represents any form of transmission of information which is convenient for the particular application. Thus if the controller furnishes an electric output to drive a motor, CA is in the form of an electrical voltage. If the controller output drives a pneumatic or hydraulic floating valve, CA is in the form of a pneumatic or hydraulic pressure. In some instances CA will actually represent the control agent and in others it is the command or action which determines the quantity or quality of the control agent through which control is effected. At the output of the system the controlled variable, V, is measured by instrumentation (not shown on block diagrams) appropriate to the application and the output of said instrumentation is applied to summation means 25.

The performance illustrated in Figs. 3a and 3b may be achieved by instrumenting the computer 27 of Fig 1 according to the block diagram of Fig. 4. Therein a memory unit 30 is energized by the output, CA, of the computer. The memory unit 30 produces an output, G, which is coupled to an integrating device, 31. The input, E, to the computer and the output, H, of the integrating device are connected to a summation means 32. the output, F, of which is the algebraic difference between its inputs, E and H. The output, F, is fed to an amplifier 33 which supplies the corrective action, CA, to the system 20.

The output, H, of the integrating device 31 is equal to $K_3$ times the integral of its input, G; that is, its transfer function is $$\frac{K_3}{S}$$

The constant, $K_3$, should be equal in magnitude to the constant, $K_1$, of the system 20, where $K_1$ is known as the sensitivity of the system. Sensitivity is defined as the rate of change of the output, V, per unit time divided by the magnitude of corrective action, CA, applied to produce this change in output. In practice it is preferred to provide means for adjusting $K_3$ to compensate for errors in the determination of $K_1$ and $T_D$.

The amplifier 33 should be a high gain saturating device characterized by maximum and minimum outputs and capable of providing any output intermediate these extremes. It may be a conventional vacuum tube or magnetic amplifier, a combination amplifier and relay, a combination amplifier and valve, a rotating electrical amplifier in the form of a motor-generator set, an amplidyne, a flow-controlled hydraulic amplifier, or the like.

The actual gain of the device is not critical so long as it is greater than a minimum necessary to make the control mechanism function.

The output, G, of the memory unit 30 is equal to $1-e^{-ST_D}$ operating on the input, CA, and is a function of the energy or information stored in the system dead time element 21. This operation may be accomplished by utilizing the circuit of Fig. 5, wherein the input, CA, is fed to a summation means 35 through two parallel paths. The first path comprises a multiplier 36 which multiplies the magnitude of the input by unity. The second path comprises a delay means 37 the output of which is an exact replica of the input except that it is delayed a period of time, $T_D$. The output, G, of the summation means 35 is equal to the algebraic difference of the inputs.

The block diagram of the controller 26 indicates only the operations which must be performed and not the physical medium which is utilized. Thus the input to element 31 could be an electrical voltage and its output a pneumatic pressure. Under these circumstances the output pressure would be equal to $K_3$ times the integral of the input voltage and it would be convenient to have the difference in status, E, in the form of a pneumatic pressure. The two pressure signals, E and H, could then be applied to a conventional pneumatic amplifier which would furnish an output, CA, proportional to the magnitude of the difference, F.

The response of the various components of the control mechanism to a step function input to the controlling variable is shown in Figs. 6a and 6b. Since the system possesses dead time, $T_D$, the controlled variable does not move after the application of corrective action until a time, $T_D$, has elapsed. At this time, $t_1$, the controlled variable, moves in a direction to reduce the status difference, E, and this status difference begins to decrease.

Upon application of corrective action the output, G, of the memory unit 30 is equal to the magnitude of corrective action, CA. This output, G, remains at this fixed level until the signal emerges from the delay unit, 37. At this time, $t_1$, the output, G, becomes zero and remains so until a new value of corrective action is applied at time, $t_2$. At time, $t_2$, the corrective action is removed and the output of the multiplier 36 becomes zero. However, the delay unit will continue to provide a negative signal to the integrating device 31 for a period of time, $T_D$. At time $t_2$, the difference in status E and the output H from element 31 are equal and the input to the amplifier 33 is zero and remains zero thereafter. However the transient excursion of the output or controlled variable continues for a period of time, $T_D$, longer due to the energy stored in the system by the elements responsible for the dead time or transport lag.

In practice the control mechanism will furnish varying degrees of corrective action during the final period, $t_2$ to $t_3$, due to errors as discussed in relation with Figs. 3a and 3b.

An application of the above-described control mechanism to the control of the pH of a fluid is illustrated in Fig. 7. Therein the dead time is introduced by a length of a pipe 50 between a point 51 at which the reagent controlling the pH of the medium flowing in the pipe is introduced, and a point 52 at which the electrode or electrodes of the pH meter 54 are installed. The dead time, $T_D$, is equal to the pipe length from the point 51 to the point 52 divided by the flow rate of the medium in the pipe. In this type of pH control installation the length of the pipe 50 is used to mix the reagent with the medium by means of the turbulent flow which exists in the mixing section. A motor 55 which positions a control valve 56 controlling the flow of reagent into the pipe 50, introduces the integrating action to the system dynamics. Thus the combination of the motor and the transport lag introduced by the pipe constitute a system which can be described by dead time plus integrating action.

The reagent which is used to control the pH of the medium flowing in the pipe 50 is stored in a container 57, and is supplied to the valve 56 under pressure produced by a pump 60. The motor 55 is coupled to the valve 56 by a gear train 61. The motor 55 may be a two-phase motor having a fixed field winding 62 and a control field winding 63. The fixed field winding 62 is excited from an alternating current source 64, and a capacitor 65 is serially connected between the winding and the source to provide the desired phase relationship between the two windings. The control field winding 63 is energized by the output of an amplifier 66. A capacitor 67 is connected across the control field winding to tune the winding for optimum output from the amplifier 66.

The pH meter 54 produces an electrical signal which is related to or proportional to the pH of the controlled variable at the point 52. This electrical signal is connected to a tap 70 on a potentiometer 71. The ends of the potentiometer 71 are connected to a suitable power source, such as a battery 72. An arm 73 of the potentiometer is connected to one of the fixed contacts of a synchronous converter 74. The electrical voltage between the tap 70 and circuit ground is representative of the status of the controlled variable and corresponds to the signal, V, of Fig. 1. The electrical voltage between the tap 70 and the arm 73 is representative of the status of the controlling variable and corresponds to the signal, r, of Fig. 1. Hence the electrical voltage between the arm 73 and ground is representative of the difference in status between the controlled and controlling variables and corresponds to the signal, E, of Fig. 1.

An electrical voltage representative of the signal, H, of Fig. 4 is connected to the other fixed contact of the synchronous converter 74. The synchronous converter 74 provides an alternating current output and also performs the summing operation of the summing means 32 of Fig. 4. Hence the electrical voltage appearing at the moving contact of the synchronous converter corresponds to the signal, F, of Fig. 4. The output of the synchronous converter 74 is connected to the input of the amplifier 66 through a capacitor 75 which serves to keep direct current voltages from the input grid of the amplifier. A grid leak resistor 76 is connected from the input of the amplifier to ground. The output of the amplifier corresponds to the corrective action, CA, of Figs. 1 and 4, and is connected to the control field winding 63 and to one of the fixed contacts of a synchronous demodulator 77. The other fixed contact of the synchronous demodulator 77 is connected to ground; hence a pulsating direct current voltage is produced at the moving contact of the synchronous demodulator. The output of the synchronous demodulator is connected to the parallel combination consisting of a capacitor 80 and a potentiometer 81. The other end of the parallel combination is connected to ground. The capacitor 80 acts as a filter for the output of the synchronous demodulator. An arm 82 of the potentiometer 81 is connected to the input of a delay unit 83 and one end of a resistor 84. The output of the delay unit 83 is connected to one end of a resistor 85. The other ends of the resistors 84, 85 are interconnected, and a resistor 86 is connected to the junction point 87 and the electrical voltage appearing at the point 87 corresponds to the signal, G, of Figs. 4 and 5.

The resistor 86 is connected to the input of an amplifier 90, and the output of the amplifier 90 is connected to one end of a potentiometer 91. The other end of the potentiometer 91 is connected to ground. A capacitor 92 is connected in parallel across the input and output of the amplifier 90. An arm 93 of the potentiometer 91 is connected to a fixed contact of the synchronous converter 74, referred to previously.

The combination of the resistors 84, 85, and 86, the amplifier 90, the capacitor 92 and the potentiometer 91 corresponds to the combination of the summing device 35 of Fig. 5 and the integrating device 31 of Fig. 4. The arm 93 of the potentiometer supplies a method for controlling the magnitude of the output, thereby providing a control for the value of $K_3$. Hence the electrical voltage appearing at the arm 93 corresponds to the signal, H, of Fig. 4.

A preferred form of the delay unit 83 is shown in Figs. 8 and 9. This is an electromagnetic delay unit with a variable delay time. Basically, the unit comprises a rotating disc 94 having a rim 95 of magnetic material, a writing head 96 positioned adjacent the rim of the disc and a reading head 97 also positioned adjacent the rim and movable along the rim with respect to the writing head 96. The disc 94 is driven at a constant speed by a constant speed motor 100 through a gear train 101. The writing head 96 comprises a U-shaped yoke 102 of magnetic material having its open end positioned over the rim 95, a coil 103 being wound around the center section of the yoke 102. One terminal of the coil is connected to the arm 82 of the potentiometer 81 and the other terminal is connected to ground. Thus a magnetic signal is induced into the rim 95 which is a function of the electrical signal appearing at the arm 82. An erasing head 104 is positioned on the rim 95 ahead of the writing head 96. The construction of the erasing head is similar to that of the writing head. An alternating current voltage of constant magnitude is connected across the terminals of the erasing head 104 to remove any magnetic signals present in the rim before it passes through the yoke 102 of the writing head 96.

The reading head 97 is constructed in the form of a flux-gate frequency doubler having a magnetic core 105 and coils 106, 107, 108 wound on the core 105. An opening 111 is provided in the core 105 and the reading head is positioned so that the rim 95 of the disc 94 passes through the opening 111. A 60-cycle voltage of fixed magnitude and frequency is connected to the coil 106 to supply the excitation for the core. The coils 107 and 108 are interconnected in additive relation and one end of the coil 107 is connected to ground. A 120-cycle voltage appears across the interconnected coils 107, 108 and its magnitude and phase are a function of the magnetic signal in that portion of the rim 95 passing through the opening 111. This 120-cycle voltage is connected to one terminal of a demodulator 113 through a resistor 114. The opposing terminal of the demodulator 113 is connected to ground, and a 120-cycle voltage having a fixed magnitude and phase is connected to the demodulator through a transformer 115. The demodulator 113 converts the 120-cycle signal of the reading head to a pulsating direct current voltage which is filtered by a series resistor 116 and a shunt capacitor 117. This filtered direct current voltage is the output of the delay unit and is connected to the resistor 85 shown in Fig. 7.

The amplifier 66 of Fig. 7 may be a conventional vacuum tube amplifier as illustrated in Fig. 10. The amplifier may consist of three stages of voltage amplification 120, 121, 122 and a final stage for power amplification 123. The voltage amplification stages may be identical and may consist of a triode vacuum tube 124 having an input signal connected to a grid 125 and an amplified output coupled from a plate 126 to the next following stage through a coupling capacitor 127. The plate 126 is coupled to a plate supply source through a resistor 128 and the grid 125 is connected to ground through a high value grid leak resistor 130. A cathode 131 is connected to ground through a cathode resistor 132 which is shunted by a by-pass capacitor 133. The power amplification stage 123 may consist of a triode vacuum tube 134 having a grid circuit similar to that of the voltage amplification stages and having a cathode 135 connected to ground through a resistor 136. The plate load of the power stage may consist of a primary winding 137 of an output transformer 138 interconnected between a plate 140 of the tube 134 and the plate power supply. A secondary winding 141 of the transformer 138 is connected to the control winding 63 of the motor 55, as shown in Fig. 7.

The amplifier 90 of Fig. 7 may be a standard NOT computer amplifier as shown in Fig. 11. Therein an input 145 is connected to a control grid 146 of a pentode vacuum tube 147. A voltage-dividing network comprising serially connected resistors 150, 151, and a potentiometer 152 is connected between the plate voltage supply and ground. A screen grid 153 of the tube 147 is connected to the junction of the resistors 150 and 151. A cathode 154 is connected to an arm 155 of the potentiometer 152 through a cathode resistor 156. A suppressor grid 157 of the tube 147 is connected directly to the cathode 154. A plate 160 of the tube 147 is connected to the plate supply voltage through a resistor 161. The plate 160 is also connected to a grid 162 of a triode vacuum tube 163. A plate 164 of the tube 163 is directly connected to the plate supply voltage. A cathode 165 of the tube 163 is connected to an anode 166 of a voltage regulator 167. The cathode 154 of the pentode tube 147 is connected to a cathode 170 of the voltage regulator tube 167 through a resistor 171. A capacitor 172 is shunt connected across the anode 166 and the cathode 170 of the voltage regulator tube. The cathode 170 of the voltage regulator tube is connected to a negative voltage supply 173 through a resistor 174, and also to an output 175.

A block diagram of an automatic control mechanism for the control of a system which can be described by dead time plus a time constant is shown in Fig. 12. This embodiment of the invention is similar to that illustrated in Figs. 1, 4 and 5, and utilizes many of the components thereof. The characteristics of the components of the control mechanism are given on the figure in the standard transfer function notation. Therein a system 200 is characterized by the dead time element 21 having the transfer function $e^{-ST_D}$ and a second element 201 having the transfer function $$\frac{K_1}{ST+1}$$

A signal, V, representative of the status of the controlled variable 23 is connected to a multiplying device 202 having the transfer function $e^{-T_D/T}$. The output, V', of the multiplying device 202 is connected to an input of the summation means 25 and the signal, r, representative of the status of the controlling variable 24 is also connected to an input of the summation means 25. The output, E', of the summation means 25 is the algebraic difference between its inputs and is connected to an input of the second summation means 32. The output, F, of the second summation means 32 is connected to the amplifier 33, and the output, CA, of the amplifier 33 is connected to the system 200 in controlling relationship.

A memory unit 203 having the transfer function $1-e^{-(ST_D+T_D/T)}$ is energized by the output, CA, of the amplifier 33. The output, G, of the memory unit 203 is connected to an integro-differential device 204 having the transfer function $$\frac{K_3}{ST+1}$$

The output, H, of the integro-differential device 204 is connected to the other input of the second summation means 32, the output, F, of the second summation means 32 being the algebraic difference between its inputs.

The memory unit 203 of Fig. 12 is similar in design to the memory unit 30 of Fig. 4 and is shown in detail in Fig. 13. The input, CA, is fed to the summation means 35 through two parallel paths. The ouput, G, of the summation means 35 is equal to the algebraic difference between its inputs. The first path comprises the multiplier 36 which multiplies the magnitude of the input by unity. The second path comprises the delay means 37 having the transfer function $e^{-ST_D}$ serially connected to a multiplying device 205 having the transfer function $e^{-T_D/T}$.

Another embodiment of the invention for the control of the system 200 of Fig. 12 is illustrated in Fig. 14. This embodiment is identical to that of Fig. 12 except as follows: The multiplying device 202 is serially connected between the output of the summation means 25 and the input of the summation means 32. The signal, V, representative of the status of the controlled variable 23 is directly connected to an input of the summation means 25. A power unit 206 having the transfer function $$\frac{1}{K_1}$$

and having an output, R, is additively coupled to the amplifier 33 by a summation means 207. The output, $CA+R$, of the summation means 207 is connected to the system 200 in controlling relationship. The signal, r, representative of the status of the controlling variable 24 is connected to the input of the power unit 206 as well as to one of the inputs of the summation means 25.

The feed-forward path provided by the power unit 206 permits a reduction in the amount of corrective action necessary during the proportional control period of the automatic control mechanism. In the analysis referred to above, it was assumed that variations in the status of the controlling element 24 were negligible in comparison to the magnitude of the corrective action, CA. Any errors in the operation of the controlled mechanism due to this assumption are corrected in the proportional control period. However, when this assumption is not valid or when it is desired to reduce the effect of variations in the status of the controlling variable 24 on the duration of the proportional control period, the feed-forward path of Fig. 14 may be utilized. In that embodiment, the power unit 206 provides additional corrective action, R, as a function of variations in the status of the controlling variable.

Another embodiment of the invention adapted to control a system 210 which can be described as the dead time element 21 and an integrating plus time constant element 211 is illustrated in Fig. 15. Therein, signals, V and r, respectively representative of the status of the controlled variable 23 and the controlling variable 24, are connected to the inputs of the summation means 25 as was the case with the embodiment of Fig. 1. The amplifier 33 has its output, CA, connected to the system 210 in controlling relationship. The output, E, of the summation means 25 is connected to the inputs of a second summation means 212 through two parallel paths. The output, F, of the second summation means 212 is the algebraic difference between its inputs and is connected to the input of the amplifier 33. In one of the parallel paths the signal, E, is connected to a lead computer 213 having the transfer function $ST+1$, the output of the lead computer 213 being connected to one of the inputs of the second summation means 212. In the second parallel path the signal, E, is connected to the series combination of a multiplying device 214 having the transfer function $e^{-T_D/T}$, a derivative unit 215 having the transfer function S and a nonlinear unit 216 having an input $x$ and an output $y$. The output $y$ of the nonlinear unit 216 is connected to the other input of the second summation means 212. Since the multiplying device 214 and the derivative unit 215 are linear components, the order of their correction in the series combination is not important. However, the nonlinear unit 216 must follow both of them.

Memory units 217, 218 are energized by the output of the amplifier 33. The output, $G_1$, of the memory unit 217 is connected to an integro-differential device 220 having the transfer function $$\frac{K_3}{ST+1}$$

The output, $H_1$, of the device 220 is subtractively combined with the output of the derivative unit 215 in a summation means 221. The output, $G_2$, of the memory unit 218 is connected to an integrating device 222 having the transfer function $$\frac{K_3}{S}$$

The output, $H_2$, of the integrating device 222 is subtractively combined with the output of the lead computer 213 in a summation means 223.

The memory unit 217 has the transfer function $1-e^{-(ST_D+T_D/T)}$ and the memory unit 218 has the transfer function $1-e^{-ST_D}$. The functions of the memory units 217, 218 may be produced by the circuit of Fig. 16. Therein, the input, CA, is fed to the multiplier 36 and the delay unit 37. The output of the multiplier 36 is connected to a summation means 224 and a second summation means 225. The output of the delay unit 37 is connected to the multiplying device 205 and to an input of the summation means 225. The output of the multiplying device 205 is connected to an input of the summation means 224, the output, $G_1$, of this summation means 224 being the algebraic difference between its inputs. The output, $G_2$, of the summation means 225 is also the algebraic difference between its inputs. The signals, $G_1$, $G_2$, of Fig. 16 correspond to the signals, $G_1$, $G_2$, of Fig. 15.

Since the system 210 of the embodiment of Fig. 15 is a second order system, a difference in status between the controlled and controlling variables will be reduced in three periods of operation. If the status difference is positive the first is a period of maximum corrective action, CA max., in a direction tending to reduce the status difference to zero, the second is a period of maximum corrective action, CA min., in the opposite direction and the third is a period in which the corrective action applied is less than the maximum available and is substantially proportional to the residual difference in status which will exist at a period of time, $T_D$, later, as predicted by the controller. In the event the difference in status is initially negative, the order in which CA max. and CA min. are applied is reversed.

The relation of the output, $y$, of the nonlinear unit 216 to the input, $x$, is determined in a manner similar to that set out in my now pending application, Serial No. 450,199, filed August 16, 1954. A switching equation may be derived by a dynamic analysis of the system. The desired relation of output to input in a nonlinear unit, so as to achieve status difference reduction in a minimum of time, is created by study of the switching equation. For the embodiment of Fig. 15 this relation of $y$ to $x$ is given by the following equations:

$$y = T|CA \text{ max.}|ln\left(1+\frac{|x|}{|CA \text{ max.}|}\right), x>0$$

$$y = -T|CA \text{ min.}|ln\left(1+\frac{|x|}{|CA \text{ min.}|}\right), x<0$$

An embodiment of the invention adapted to control a system 230 which can be described as having the dead time element 21 and two time constants 231 is illustrated in Fig. 17, $T_2$ being greater than $T_1$. This embodiment is similar to that of Fig. 15 and differs from it in the following ways. A feed-forward path comprising the power unit 206 and the summation means 207 is utilized in the same manner as in the embodiment of Fig. 14. The series combination of a lead computer 232 having the transfer function $ST_1+1$ and a multiplying device 233 having a transfer function $e^{-T_D/T_2}$ is substituted for the lead computer 213 of Fig. 15. The series combination of a second lead computer 234 having a transfer function $ST_2+1$ and a second multiplying device 235 having a transfer function $e^{-T_D/T_1}$ is substituted for the series combination of the multiplying device 214 and the derivative unit 215 of Fig. 15. A nonlinear unit 236 having the following relation between its output and input is utilized in place of the nonlinear unit 216 of Fig. 15:

$$y = -K_1|CA\ max.| + (K_1|CA\ max.|)^{1-T_1/T_2}(|x| + K_1|CA\ max.|)^{T_1/T_2}, x > 0$$

$$y = +K_1|CA\ min.| - (K_1|CA\ min.|)^{1-T_1/T_2}(|x| + K_1|CA\ min.|)^{T_1/T_2}, x < 0$$

A memory unit 240 having a transfer function $1-e^{-(ST_D+T_D/T_1)}$ replaces the memory unit 217, a memory unit 241 having a transfer function $1-e^{-(ST_D+T_D/T_2)}$ replaces the memory unit 218, an integro-differential device 242 having the transfer function $$\frac{K_3}{ST_1+1}$$

replaces the device 220, and an integro-differential device 243 having a transfer function $$\frac{K_3}{ST_2+1}$$

replaces the device 222 of Fig. 15.

Another embodiment of the invention adapted to control a system 245 which can be described as the dead time element 21 and an integrating action plus two time constants 246 is illustrated in Fig. 18. This embodiment is similar to the embodiments of Fig. 17 with the following exceptions. The feed-forward path of Fig. 17 is omitted. The output, E, of the summation means 25 is connected to the lead computer 234 and the output of the lead computer 234 is connected to the inputs of the summation means 212 by two parallel paths. The first parallel path consists only of the lead computer 232 and the summation means 223 of Fig. 17. The second parallel path consists of the series combination of a multiplying-derivative unit 247 having the transfer function $Se^{-T_D/T_1}$, the summation means 221 and a nonlinear unit 248. The output, y, of the nonlinear unit 248 is related to the input, x, by the same equations that are applied to the nonlinear unit 216 of Fig. 15 with $T_1$ subsituted for T.

The two embodiments are identical except for the additional lead computer 234 having the transfer function $ST_2+1$ in the embodiment of Fig. 18.

If the transfer function of the lead computer 234 of Fig. 18 was changed to $ST_1+1$ and the transfer function of the lead computer 232 was changed to $ST_2+1$, it would only be necessary to substitute $T_2$ for $T_1$ in the transfer functions of the units 240, 242, 247 and 248 for the embodiment of Fig. 18 to be applicable to this variation. Ordinarily the transfer functions having the larger time constants of the system are utilized in the units 232 and 247 and the remaining time constant or constants are utilized in the unit 234. The criteria for this selection are set out more fully in my now pending application, Serial No. 450,199. The signal $H_1$ is produced by the series combination of the memory unit 240 and the integro-differential device 242 of Fig. 17 while the signal $H_2$ is produced by the memory unit 218 and the integrating device 222 of Fig. 15.

Although I have disclosed several exemplary embodiments of my invention and have discussed its application to the control of a particular type of system, it will be understood that other applications of the invention are possible and that the embodiments disclosed may be subjected to various changes, modifications and substitutions without necessarily departing from the spirit of the invention.

I claim as my invention:

1. In an automatic control mechanism for reducing, in a minimum of time, the difference in status of controlled and controlling variables of a system characterized by dead time energy and employing sensing means producing signals representative of the status of said controlled and controlling variables, the combination of: amplifier means having an input and producing an output continuously variable between two limits, said variation being in response to maximum and intermediate magnitude signals supplied to said input; means connecting said amplifier means output to said system in controlling relationship; computer means comprising a composite network producing an output which is a function of said difference and said dead time energy in said system, said composite network including means responsive to said difference and said dead time energy, said computer means producing said maximum and intermediate signals supplied to said amplifier input; means connecting said computer means output to said amplifier means input; means for supplying signals representing said difference in status to said computer means; and means for supplying signals representing said dead time energy to said computer means.

2. An automatic control mechanism as defined in claim 1 including a power unit having an input and an output, said output being substantially a linear function of said input, means for supplying a signal representative of the status of said controlling variable to said power unit input, and circuit means connecting said power unit output to said amplifier means output in additive relationship.

3. A predictor controller for generating corrective action to reduce the difference in status of the controlled and controlling variables of a system characterized by dead time corrective action energy stored therein, comprising: a first input receiving a first signal representative of the status of said controlled variable; a second input receiving a second signal representative of the status of said controlling variable; amplifier means having an output continuously variable between two limits; means for connecting said amplifier means output to said system in controlling relationship; a first computer producing a third signal representative of said amplifier means output and said dead time corrective action energy stored in said system; means coupling said first, second and third signals to a second computer; and means coupling said second computer to said amplifier means, said second computer producing an output driving said amplifier means, said second computer output including a prediction signal representative of the difference in status which will exist in said system at an interval of time later, said interval being equal to said dead time.

4. In an automatic control mechanism for a system characterized by dead time, $T_D$, and having a controlled variable and a controlling variable, the combination of: first measuring means producing a first signal representative of the status of said controlled variable; second measuring means producing a second signal representative of the status of said controlling variable; summation means having an output and two inputs, said output being the algebraic difference between said inputs; means connecting each of said first and second measuring means to one of said summation means inputs respectively in signal transmitting relationships; controller means connected intermediate said summation means output and said system, said controller means including amplification means having an output continuously variable between two limits, said amplification means output being connected to said system in controlling relationship; memory means producing a third signal representative of said amplification means output at a period of time, $T_D$, earlier; and circuit means combining said third signal with said summation means output in said controlling means.

5. An automatic control mechanism as defined in claim 4 in which said memory means includes two parallel paths, each of said parallel paths having an input and an output, the first of said parallel paths including means for delaying an output signal with respect to an input signal for a period of time equal to the dead time of the system, the second of said parallel paths transmitting an input signal to said second parallel path output without modification, and means coupling each of said parallel path inputs to said amplification means output, said outputs of said parallel paths being combined to form said third signal.

6. In an automatic control mechanism for a system the dynamic characteristic of which can be described as dead time, $e^{-ST_D}$, plus integrating action, $$\frac{K_1}{S}$$

and including sensing means producing signals representative of the status of the controlled and controlling variables of said system, the combination of: a first summation means having two inputs and an output which is the algebraic difference between said inputs; means connecting said controlled variable status signal to one of said first summation means inputs; means connecting said controlling variable status signal to the other of said first summation means inputs; a second summation means having two inputs and an output which is the algebraic difference between said inputs; means connecting said first summation means output to one of said second summation means inputs; amplifier means having an input and producing an output continuously variable between two limits; means connecting said second summation means output to said amplifier means input; means connecting said amplifier means output to said system in controlling relationship; a memory computer having the transfer function, $1-e^{-ST_D}$; an integrating device having the transfer function $$\frac{K_3}{S}$$

where $K_3$ is approximately equal to $K_1$; means connecting said amplifier means output to said computer; means connecting said computer to said device; and means connecting said device to the other of said second summation means inputs.

7. In an automatic control mechanism for a system the dynamic characteristic of which can be described as dead time, $e^{-ST_D}$, plus a time constant, $$\frac{K_1}{ST+1}$$

and including sensing means producing signals representative of the status of the controlled and controlling variables of said system, the combination of: a first summation means having two inputs and an output which is the algebraic difference between said inputs; a multiply unit having the transfer function $e^{-T_D/T}$; means connecting said controlled variable status signal to said multiplying unit; means connecting said multiplying unit to one of said first summation means inputs; means connecting said controlling variable status signal to the other of said first summation means inputs; a second summation means having two inputs and an output which is the algebraic difference between said inputs; means connecting said first summation means output to one of said second summation means inputs; amplifier means having an input and producing an output continuously variable between two limits; means connecting said second summation means output to said amplifier means input; means connecting said amplifier means output to said system in controlling relationship; a memory computer having the transfer function $1-e^{-(T_D/T+ST_D)}$; an integro-differential device having the transfer function $$\frac{K_3}{ST+1}$$

where $K_3$ is approximately equal to $K_1$; means connecting said amplifier means output to said computer; means connecting said computer to said device; and means connecting said device to the other of said second summation means inputs.

8. In an automatic control mechanism for a system the dynamic characteristic of which can be described as dead time, $e^{-ST_D}$, plus a time constant, $$\frac{K_1}{ST+1}$$

and including sensing means producing signals representative of the status of the controlled and controlling variables of said system, the combination of: a first summation means having two inputs and an output which is the algebraic difference between said inputs; means connecting said controlled variable status signal to one of said first summation means inputs; means connecting said controlling variable status signal to the other of said first summation means inputs; a second summation means having two inputs and an output which is the algebraic difference between said inputs; a multiplying unit having the transfer function $e^{-T_D/T}$; means connecting said first summation means output to said multiplying unit; means connecting said multiplying unit to one of said second summation means inputs; amplifier means having an input and producing an output continuously variable between two limits; means connecting said second summation means output to said amplifier means input; a third summation means having two inputs and an output which is the algebraic sum of said inputs; means connecting said amplifier means output to one of said third summation means inputs; means connecting said third summation means output to said system in controlling relationship; a memory computer having the transfer function $1-e^{-(T_D/T+ST_D)}$; an integro-differential device having the transfer function $$\frac{K_3}{ST+1}$$

where $K_3$ is approximately equal to $K_1$; means connecting said amplifier means output to said computer; means connecting said computer to said device; means connecting said device to the other of second summation means inputs; a power unit having the transfer function $$\frac{1}{K_1}$$

means connecting said controlling variable status signal to said power unit; and means connecting said power unit to the other of said third summation means inputs.

9. In an automatic control mechanism for a system the dynamic characteristic of which can be described as dead time, $e^{-ST_D}$, plus integrating action and a time constant, $$\frac{K_1}{S(ST+1)}$$

and including sensing means producing signals representative of the status of the controlled and controlling variables of said system, the combination of: a first summation means having two inputs and an output which is the algebraic difference between said inputs; means connecting said controlled variable status signal to one of said first summation means inputs; means connecting said controlling variable status signal to the other of said first summation means inputs; amplifier means having an input and producing an output continuously variable between two limits; means connecting said amplifier means output to said system in controlling relationship; first circuit means connected intermediate said first summation means output and said amplifier means input, said first circuit means including first and second parallel paths, the output of said first circuit means being the algebraic difference between said first and second parallel paths, said first path including a lead computer having the transfer function $ST+1$, said second path including a nonlinear unit and a series unit consisting of a multiplying unit and a derivative unit serially connected, said multiplying unit having the transfer function $e^{-T_D/T}$, said derivative unit having the transfer function $S$, the output of said nonlinear unit being a nonlinear function of its input; and second circuit means connected intermediate said amplifier means output and said first circuit means, said second circuit means including third and fourth parallel paths, said third parallel path including a serially connected first memory computer and an integro-differential device, said first memory computer having the transfer function $1-e^{-(ST_D+T_D/T)}$, said integro-differential device having the transfer function $$\frac{K_3}{ST+1}$$

where $K_3$ is approximately equal to $K_1$, said third parallel path being connected to the output of said series unit and ahead of said nonlinear unit in subtractive relationship, said fourth parallel path including a serially connected second memory computer and an integrating device, said second memory computer having the transfer function $1-e^{-ST_D}$, said integrating device having the transfer function $$\frac{K_3}{S}$$

said fourth parallel path being connected to the output of said lead computer in subtractive relationship.

10. In an automatic control mechanism for a system the dynamic characteristic of which can be described as dead time, $e^{-ST_D}$, plus two time constants, $$\frac{K_1}{(ST_1+1)(ST_2+1)}$$

and including sensing means producing signals representative of the status of the controlled and controlling variables of said system, the combination of: a first summation means having two inputs and an output which is the algebraic difference between said inputs; means connecting said controlled variable status signal to one of said first summation means inputs; means connecting said controlling variable status signal to the other of said first summation means inputs; amplifier means having an input and producing an output continuously variable between two limits; a second summation means having two inputs and one output which is the algebraic sum of said inputs; means connecting said amplifier means output to one of said second summation means inputs; means connecting said second summation means ouput to said system in controlling relationship; first circuit means connected intermediate said first summation means output and said amplifier means input, said first circuit means including first and second parallel paths, the output of said first circuit means being the algebraic difference between first and second parallel paths, said first path including a serially connected first lead computer and a first multiplying unit, said first lead computer having the transfer function $ST_1+1$, said first multiplying unit having the transfer function $e^{-T_D/T_2}$, said second path including a nonlinear unit and a series unit consisting of a second lead computer and a second multiplying unit, said second lead computer having the transfer function $ST_2+1$, said second multiplying unit having the transfer function $e^{-T_D/T_1}$, the output of said nonlinear unit being a nonlinear function of its input; second circuit means connected intermediate said amplifier means output and said first circuit means, said second circuit means including third and fourth parallel paths, said third parallel path including a serially connected first memory computer and first integro-differential device, said first memory computer having the transfer function $1-e^{-(ST_D+T_D/T_1)}$, said first integro-differential device having the transfer function $$\frac{K_3}{ST_1+1}$$

where $K_3$ is approximately equal to $K_1$, said third parallel path being connected to the output of said series unit and ahead of said nonlinear unit in subtractive relationship, said fourth parallel path including a serially connected second memory computer and second integro-differential device, said second memory computer having the transfer function $1-e^{-(ST_D+T_D/T_2)}$, said second integro-differential device having the transfer function $$\frac{K_3}{ST_2+1}$$

said fourth parallel path being connected to the output of said serially connected first multiplying unit and first lead computer in subtractive relationship; a power unit having the transfer function $$\frac{1}{K_1}$$

means connecting said controlling variable status signal to said power unit; and means connecting said power unit to the other of said second summation means inputs.

11. In an automatic control mechanism for a system the dynamic characteristic of which can be described as dead time, $e^{-ST_D}$ plus integrating action and two time constants, $$\frac{K_1}{S(ST_1+1)(ST_2+1)}$$

and including sensing means producing signals representative of the status of the controlled and controlling variables of said system, the combination of: a first summation means having two inputs and an output which is the algebraic difference between said inputs; means connecting said controlled variable status signal to one of said first summation means inputs; means connecting said controlling variable status signal to the other of said first summation means inputs; amplifier means having an input and producing an output continuously variable between two limits; means connecting said amplifier means output to said system in controlling relationship; a first lead computer having the transfer function $ST_2+1$; means connecting said first summation means output to said first lead computer; first circuit means connected intermediate said first lead computer and said amplifier means input, said first circuit means including first and second parallel paths, the output of said first circuit means being the algebraic difference between said first and second parallel paths, said first path including a second lead computer having the transfer function $ST_1+1$, said second path including a serially connected multiplying-derivative unit and nonlinear unit, said multiplying-derivative unit having the transfer function $Sa^{-T_D/T_1}$, the output of said nonlinear unit being a nonlinear function of its input; and second circuit means connected intermediate said amplifier means output and said first circuit means, said second circuit means including third and fourth parallel paths, said third parallel path including a serially connected first memory computer and an integro-differential device, said first memory computer having the transfer function $1-e^{-(ST_D+T_D/T_1)}$, said integro-differential device having the transfer function $$\frac{K_3}{ST_1+1}$$

where $K_3$ is approximately equal to $K_1$, said third parallel path being connected to the output of said multiplying-derivative unit and ahead of said nonlinear unit in subtractive relationship, said fourth parallel path including a serially connected second memory computer and an integrating device, said second memory computer having the transfer function $1-e^{-ST_D}$, said integrating device having the transfer function $$\frac{K_3}{S}$$

said fourth parallel path being connected to the output of said second lead computer in subtractive relationship.

12. A method of reducing a difference in status between controlled and controlling variables of a system characterized by an $n$th order differential equation plus dead time, in a minimum of time by use of a limited corrective force continuously variable within two limits, which method comprises: applying corrective force for $m$ periods, $m$ being $n+1$ but no larger than 3, by applying during the first period a maximum corrective force in a direction tending to reduce the difference, and by applying during the last period a corrective force that is substantially proportional to the residual difference which will exist at an interval of time later, the interval being equal to the dead time.

13. A method as defined in claim 12 in which the first and last periods are separated by a second period when $n$ is at least 2, and including the step of applying during the second period corrective force that is a maximum in a direction opposite to that of the first period.

14. A method of reducing a difference in status between controlled and controlling variables of a system characterized by a first order differential equation plus dead time, in a minimum of time by use of a limited corrective force continuously variable within two limits, which method includes the steps of: applying a maximum corrective force in a sense tending to reduce the difference in status for a first period of time; terminating the first period of time when it appears that the difference in status will be zero at the end of another period of time equal to the dead time if the sytsem continues in its present trajectory; and applying a corrective force for a second period, said corrective force being less than maximum and substantially proportional to the residual difference which will exist at an interval of time later, the interval being equal to the dead time.

15. A method of reducing a difference in status between controlled and controlling variables of a system characterized by an $n$th order differential equation plus dead time, in a minimum of time by use of a limited corrective force actuated by computer means and being continuously variable within two limits, which method includes the steps of: injecting signals representative of the status of the controlled and controlling variables respectively into the computer means; injecting a third signal representative of the combination of the output of the computer means and the corrective dead time energy in the system, into the computer means; combining these signals; and controlling the corrective forces with the resultant signal thereby producing an output varying in $m$ periods, $m$ being $n+1$ but no larger than 3, the first period being one of maximum corrective force in a sense tending to reduce the difference, and the last period being one in which the corrective force is substantially proportional to the residual difference which will exist at an interval of time later, the interval being equal to the dead time.

16. A method as defined in claim 15 in which the first and last periods are separated by a second period when $n$ is at least 2, the second period being one in which the corrective force is a maximum in a sense opposite to that of the first period.

17. A method of reducing a difference in status between controlled and controlling variables of a system characterized by dead time by use of a limited corrective force which is continuously variable within two limits, which method includes the steps of: producing first and second signals representative of the status of the controlled and controlling variables respectively and combining them to form a third signal representative of the difference in status; producing a fourth signal representative of the corrective force presently being applied to the system; delaying the fourth signal for a period of time equal to the system dead time; combining the delayed fourth signal with the present fourth signal to form a dead time feedback signal; and coupling the status difference signal with the dead time feedback signal to produce a control signal for actuating the corrective force.

18. In an automatic control mechanism for reducing, in a minimum of time, the difference in status of controlled and controlling variables of a system characterized by dead time energy and employing sensing means producing signals representative of the status of said controlled and controlling variables, the combination of: amplifier means having an input and producting an output continuously variable between two limits in response to varying signals supplied to said input; means connecting said amplifier means output to said system in controlling relationship; computer means comprising a composite network producing an output which is a function of said difference and said dead time energy in said system, said composite network including means responsive to said difference and said dead time energy; means connecting said computer means output to said amplifier means input, said computer means producing said signals supplied to said amplifier input; means for supplying signals representing said difference in status to said computer means; and means for supplying signals representing said dead time energy to said computer means.

No references cited.

UNITED STATES PATENT OFFICE
Certificate of Correction

Patent No. 2,829,322

April 1, 1958

Lawrence M. Silva

It is hereby certified that error appears in the printed specification of the above numbered patent requiring correction and that the said Letters Patent should read as corrected below.

Column 2, line 25, for "limitatons" read —limitations—; column 4, line 52, for "ingrating" read —integrating—; column 5, line 6, after "form" strike out the period and insert instead a colon; line 71, for "ime" read —time—; column 8, lines 57 to 59, for $$\frac{K3}{S} \quad \text{read} \quad \frac{K_3}{S}$$

column 17, lines 49 and 50, for "multiply" read —multiplying—; column 19, line 49, for "ouput" read —output—; column 20, line 25, before "plus" insert a comma; line 53, after "function" for "$Sa$" read —$Se$—.

Signed and sealed this 20th day of May 1958.

[SEAL]

Attest:
KARL H. AXLINE,
*Attesting Officer.*

ROBERT C. WATSON,
*Commissioner of Patents.*